United States Patent [19]
Tanamachi et al.

[11] Patent Number: 5,321,599
[45] Date of Patent: Jun. 14, 1994

[54] CONTROL APPARATUS FOR SUPPRESSING A THIRD HARMONIC NEUTRAL POINT VOLTAGE IN A THREE LEVEL INVERTER

[75] Inventors: Tokunosuke Tanamachi, Katsuta; Kiyoshi Nakata, Ibaraki; Kiyoshi Nakamura, Katsuta, all of Japan

[73] Assignee: Hitachi, Ltd., Tokyo, Japan

[21] Appl. No.: 9,005

[22] Filed: Jan. 26, 1993

[30] Foreign Application Priority Data

Feb. 12, 1992 [JP] Japan .................... 4-024995

[51] Int. Cl.⁵ .......................................... H02M 7/48
[52] U.S. Cl. ...................................... 363/41; 318/811
[58] Field of Search ............... 307/105; 363/41-43; 318/802, 811; H02M 7/48

[56] References Cited

U.S. PATENT DOCUMENTS

| | | | |
|---|---|---|---|
| 3,775,663 | 11/1973 | Turnbull . | |
| 4,757,434 | 7/1988 | Kawabata et al. | 363/41 |
| 4,799,139 | 1/1989 | Kahipuro et al. | 363/95 |
| 4,953,069 | 8/1990 | Braun | 363/41 |
| 5,227,963 | 7/1993 | Schauder | 363/41 |

FOREIGN PATENT DOCUMENTS

| | | | |
|---|---|---|---|
| 451440 | 10/1991 | European Pat. Off. | ... H02M 7/5387 |
| 3627294 | 2/1988 | Fed. Rep. of Germany | H02M 7/48 |
| 56-74088 | 6/1981 | Japan | H02M 7/537 |
| 61-22763 | 1/1986 | Japan | H02M 7/48 |
| 2-261063 | 10/1990 | Japan | H02M 7/48 |

*Primary Examiner*—William H. Beha, Jr.
*Attorney, Agent, or Firm*—Antonelli, Terry, Stout & Kraus

[57] ABSTRACT

The present invention relates to a control apparatus of a three-level inverter and intends to provide a control apparatus of simplified construction which can suppress a fluctuation in neutral point voltage effectively. Only a third harmonic component which is particularly large in the fluctuation in neutral point voltage is suppressed, a third harmonic component for suppression has a ratio of amplitude to that of a fundamental wave and a phase which are set to be constant regardless of the inverter frequency, and this third harmonic component is applied to a command of the fundamental wave.

9 Claims, 11 Drawing Sheets

FIG. 2

| SWITCHING STAGE | | | | OUTPUT PHASE VOLTAGE |
|---|---|---|---|---|
| G1U (G1V G1W) | G2U (G2V G2W) | G3U (G3V G3W) | G4U (G4V G4W) | U-N VOLTAGE (V-N VOLTAGE W-N VOLTAGE) |
| ON | ON | OFF | OFF | $E_d/2$ |
| OFF | ON | ON | OFF | 0 |
| OFF | OFF | ON | ON | $-E_d/2$ |

R1 : PRIMARY RESISTANCE (0.1445Ω)
R2 : SECONDARY RESISTANCE (0.186Ω)
L1 : PRIMARY LEAKAGE INDUCTANCE (1.168mH)
L2 : SECONDARY LEAKAGE INDUCTANCE (1.168mH)
L0 : EXCITING FIELD INDUCTANCE (41.76mH)
Finv : INVERTER OUTPUT FREQUENCY
Fs : SLIP FREQUENCY

CONTROL APPARATUS FOR SUPPRESSING A THIRD HARMONIC NEUTRAL POINT VOLTAGE IN A THREE LEVEL INVERTER

BACKGROUND OF THE INVENTION

The present invention relates to a control apparatus of a power converter for converting direct current into AC phase voltages each having three or more levels of potential and more particularly to the suppression of a fluctuation in neutral point voltage.

When a load such as an induction motor is driven by a pulse width modulation inverter, it is desirable that higher harmonic components contained in an AC output voltage of the inverter be reduced.

As an inverter meeting this requirement, an inverter called a three-level inverter has been proposed in, for example, Japanese Patent un-examined publication No. JP-A-56-74088.

A problem specific to the three-level inverter is that voltage at a series connection junction (hereinafter referred to as a neutral point) between voltage dividing capacitors connected in series is caused to fluctuate by current flowing into and flowing out of the neutral point. A technique of suppressing this fluctuation is disclosed in Japanese Patent unexamined publication No. JP-A-2-261063.

The neutral point voltage fluctuation suppressing technique disclosed in the above publications suppresses the fluctuation in voltage at the neutral point in feed forward fashion by calculating, from the primary frequency and power-factor angle, an instantaneous level of a command which nullifies zero-phase-sequence voltage and applying the command to a voltage command to thereby suppress the fluctuation in voltage at the neutral point.

In an application to, for example, a control apparatus of an induction motor for electric vehicle drive, however, the microprocessor has to perform other various operations and cannot afford to carry out such a complicated operation as above at an instantaneous level.

SUMMARY OF THE INVENTION

An object of the present invention is to provide a control apparatus of simplified construction which can suppress the fluctuation in neutral point voltage effectively.

To accomplish the above object, in a control apparatus of power converter comprising a plurality of capacitors connected in series to divide DC voltage, a power converter fed with direct current from the capacitors and operative to convert the direct current into AC phase voltages each having three or more levels of potential, and modulating wave generator unit for generating a command of a fundamental wave of alternating current delivered out of the power converter, the modulating wave generator unit has a unit for applying to the fundamental wave a third harmonic component thereof, and the third harmonic component is derived using values which do not change with the frequency of the fundamental wave.

Of alternating fluctuations in voltage at the neutral point, a third harmonic component has the maximum amplitude. The amplitude of the other components is not so large in comparison with the remaining ripples and is negligible.

Accordingly, in the present invention, only the third harmonic component is handled as an object to be suppressed to thereby simplify the control.

The third harmonic component changes complicatedly with the frequency of the fundamental wave (inverter frequency) but since a third harmonic component for suppression of the third harmonic component is derived using values which do not change with the frequency of the fundamental wave, any complicated operations in compliance with a change in the frequency of the fundamental wave are not needed.

BRIEF DESCRIPTION OF THE DRAWINGS

FIG. 2 is a diagram showing the relation between the switching state of a three-level inverter and the output phase voltage;

DESCRIPTION OF THE PREFERRED EMBODIMENTS

Figure 1:
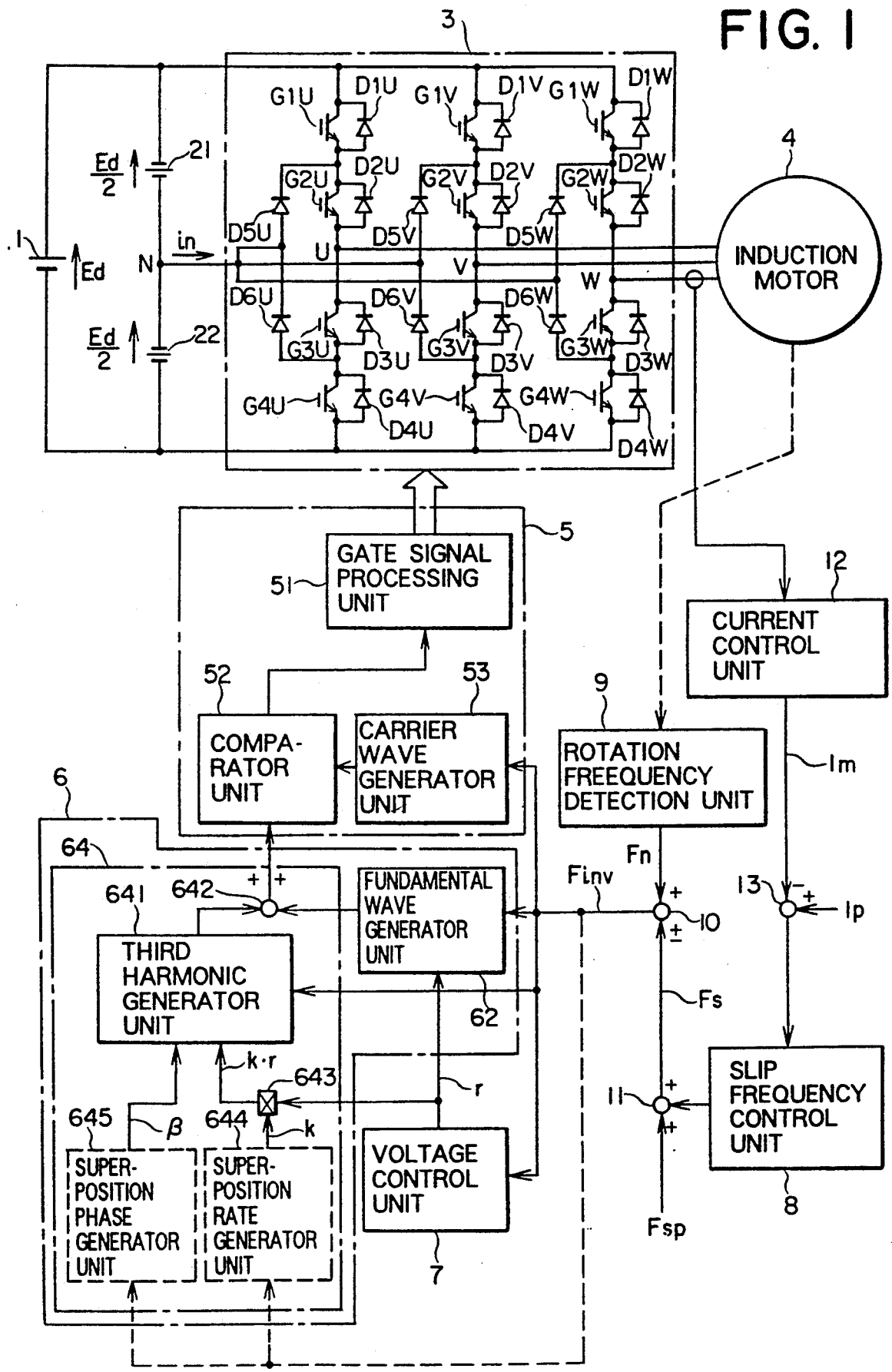
FIG. 1 is a schematic diagram showing an embodiment of the invention.

FIG. 1 is a circuit construction showing an embodiment of the present invention.

Reference numeral 1 designates a DC power supply, 21 and 22 voltage dividing capacitors connected in series to divide voltage $E_d$ of the DC power supply 1 into two DC voltages of $E_d/2$, 3 a pulse width modulation three-level inverter for converting the two DC voltages into a three-phase AC voltage, and 4 an induction motor driven by the inverter 3.

The inverter 3 has three-level switching arms of U phase, V phase and W phase the U-phase (V-phase or W-phase) switching arm of which consists of self-arc extinguishable switching elements (for example, IGBT's, GTO's, power transistors) G1U to G4U (G1V to G4V, G1W to G4W), rectifier elements (flywheel diodes) D1U to D4U (D1V to D4V, D1W to D4W) and auxiliary rectifier elements (clamp diodes) D5U to D6U (D5V to D6V, D5W to D6W).

Each connection junction between auxiliary rectifier elements D5U and D6U, between auxiliary rectifier elements D5V and D6V or between auxiliary rectifier elements D5W and D6W of each phase is connected to a series connection junction (hereinafter referred to as a neutral point) N between voltage dividing capacitors 21 and 22, and the switching elements G1U to G4U, G1V to G4V and G1W to G4W of the respective phases are on/off operated as shown in FIG. 2 by an output of modulating wave generator unit 6 applied through modulating unit 5, thereby delivering three-level voltages (phase voltages) of $E_d/2$, 0 and $-E_d/2$ between the neutral point N and respective output terminals U, V and W of the respective phases.

In FIG. 1, a rotation frequency $F_n$ of the induction motor 4 is detected by detection unit 9 and a slip frequency $F_s$ is added to the rotation frequency during power running and is subtracted from the rotation frequency during regeneration by means of addition/subtraction unit 10. By this, an output frequency $F_{inv}$ ($F_n \pm F_s$) of the inverter 3 is provided.

Figure 3:
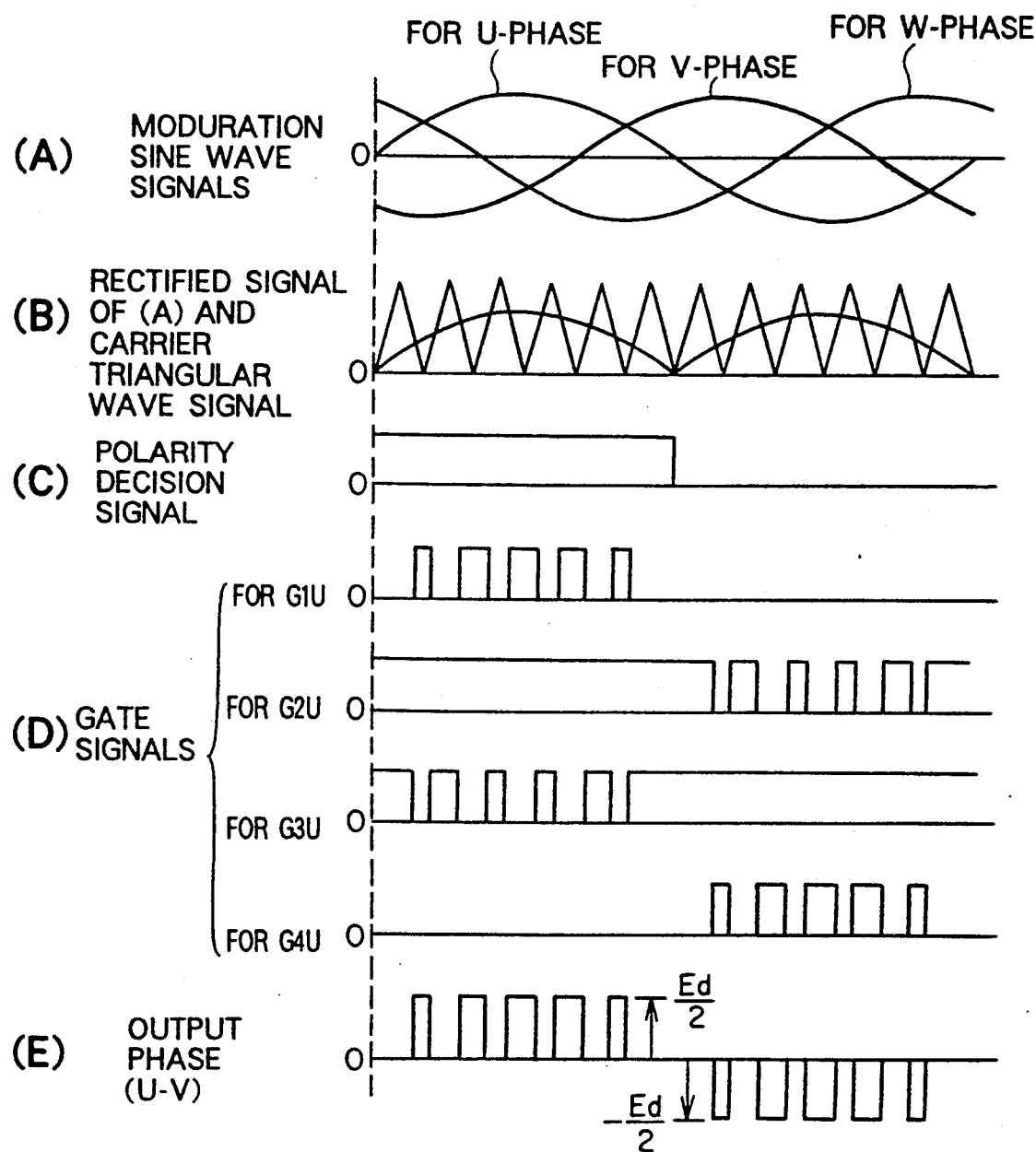
FIG. 3 is a diagram for explaining the operation of pulse width modulation for the three-level inverter.

In modulating wave generator unit 6, fundamental wave generator unit 62 generates sine wave signals of U, V and W phases as shown at (A) in FIG. 3.

In the modulating unit 5, carrier wave generator unit 53 receives the output of the addition/subtraction unit 10 and generates a triangular wave signal as shown at (B) in FIG. 3. When the frequency of the triangular wave signal is set to be sufficiently higher than that of the sine wave signal, the frequency of the triangular wave signal is not required to depend on the inverter output frequency $F_{inv}$ and it may be constant. By using a signal derivable from a comparison as shown at (B) in FIG. 3 of a signal stemming from rectification of, for example, the U-phase sine wave with the triangular wave signal and a polarity decision signal as shown at (C) in FIG. 3 of the sine wave, comparator unit 52 produces gate signals for U-phase switching elements G1U to G4U as shown at (D) in FIG. 3 (although not illustrated, gate signals for V-phase switching elements G1V to G4V and gate signals for W-phase switching elements G1W to G4W are delivered in a similar manner). Generally, this modulating scheme is called unipolar modulation.

At that time, a U-phase output phase voltage (voltage between U and N) of the inverter 3 assumes a waveform having three potential levels ($E_d/2$, 0, $-E_d$) as shown at (E) in FIG. 3 and the magnitude of a fundamental wave component of the output phase voltage can be controlled by changing a ratio of peak value of the sine wave to that of the triangular wave shown at (B) in FIG. 3, that is, a percentage modulation $\gamma$.

The percentage modulation $\gamma$ and the slip frequency $F_s$ can be controlled as follows.

More particularly, the percentage modulation $\gamma$ is controlled by the inverter output frequency $F_{inv}$ through voltage control unit 7 such that the ratio between output voltage and output frequency of the inverter 3 becomes constant.

The slip frequency $F_s$ is controlled by comparing a value $I_m$ (effective value) of current of induction motor 4 detected by detector unit 12 with a current reference value $I_p$ by means of subtraction unit 13, supplying a difference ($I_p - I_m$) to slip frequency control unit 8 and adding an output thereof and a slip frequency reference value $F_{sp}$ by means of addition unit 11.

A fluctuation in voltage at the neutral point N i.e., a current flowing into and flowing out of the neutral point N during the above control will now be described with reference to FIG. 4.

Figure 4:
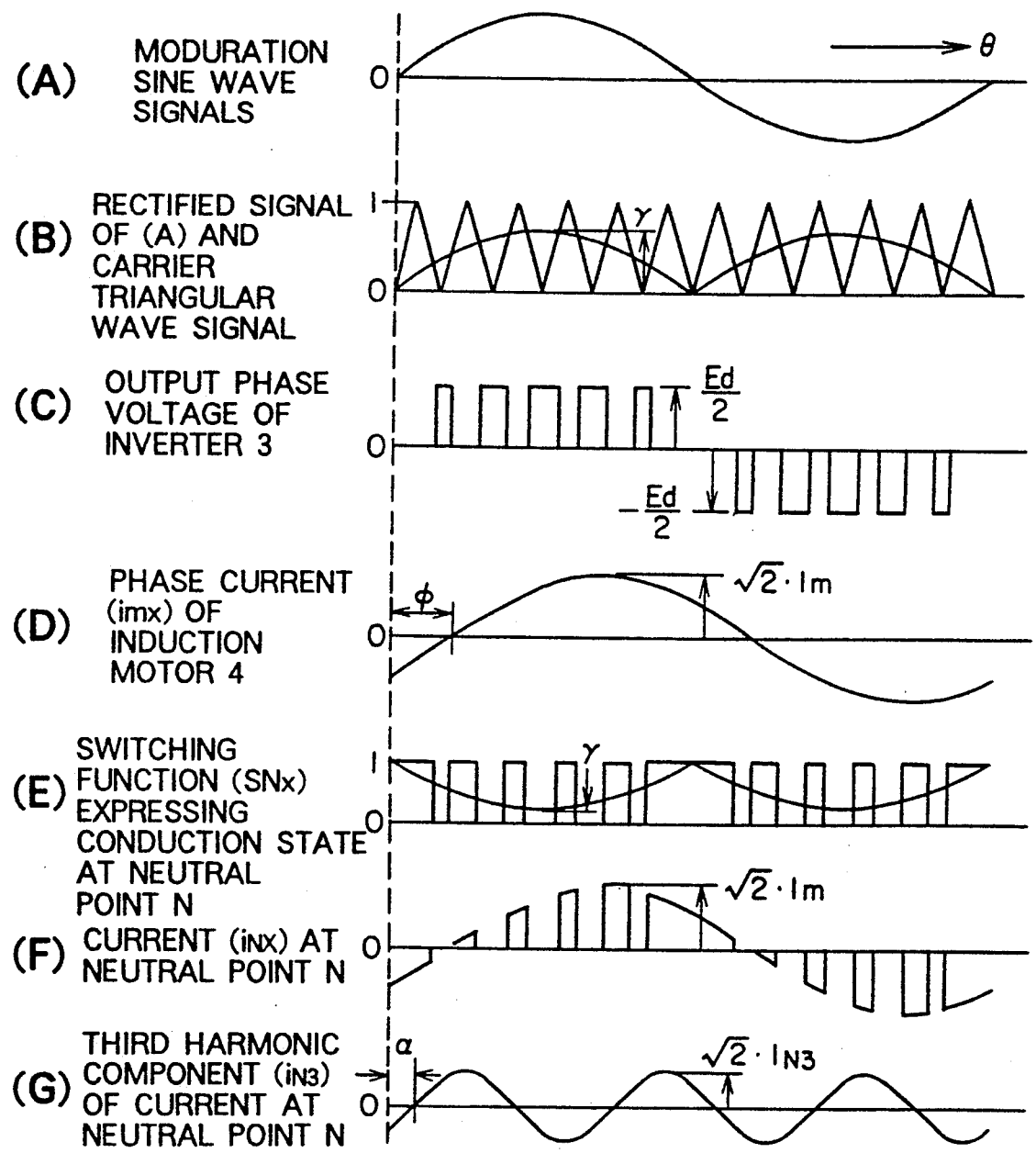
FIG. 4 is a diagram for explaining the operation of a third harmonic component of current at the neutral point and neutral point voltage fluctuation.

As described previously, by comparing a signal stemming from rectification of the fundamental wave (modulating sine wave) (of one phase) shown at (A) in FIG. 4 with the carrier triangular wave shown at (B) in FIG. 4, an output phase voltage of inverter 3 having three potential levels ($E_d/2$, 0, $-E_d/2$) as shown at (C) in FIG. 4 is obtained.

The amplitude of the output phase voltage is controlled b changing the ratio (percentage modulation $\gamma$) of peak value ($=\gamma$) of the fundamental wave of the output phase voltage to peak value ($=1$) of the carrier triangular wave.

It is now assumed that phase current $i_{mx}$ of the induction motor 4 (output phase current of the inverter 3) is a sine wave which lags by a power-factor angle $\phi$ relative to the modulating sine wave (the fundamental wave of the output phase voltage of inverter 3) as shown at (D) in FIG. 4 and which is given by expression 1.

$$i_{mx} = \sqrt{2}\ i_m = \sin(\theta - \phi) \tag{1}$$

Illustrated at (E) in FIG. 4 is a switching function $S_{Nx}$ which expresses conduction state of current flowing into and flowing out of the neutral point N in terms of 1 and 0 by indicating the conduction state by 1. The conduction state corresponds to the period that the output phase voltage of inverter 3 shown at (C) in FIG. 4 is zero.

The non-conduction state represented by 0 corresponds to the period that the output phase voltage of inverter 3 shown at (C) in FIG. 4 is not zero.

Expression 2 resulting from multiplication of the switching function $S_{Nx}$ by phase current $i_{mx}$ of the induction motor 4 represents current $i_{Nx}$ flowing through neutral point N which is as shown at (F) in FIG. 4.

$$i_{Nx} = S_{Nx} = i_{mx} \tag{2}$$

The current $i_{Nx}$ at neutral point N of expression 2 can be given by expression 5 on the basis of the switching function $S_{Nx}$, which is given by expression 3 as indicated by thin curve at (E) in FIG. 4 and then expanded into a Fourier series of expression 4, and the phase current I mx of induction motor 4 as indicated by expression 1.

$$\begin{aligned} S_{Nx} &= 1 - \gamma \cdot \sin\theta \ldots (0 \leq \theta \leq \pi) \\ &= 1 + \gamma \cdot \sin\theta \ldots (\pi \leq \theta \leq 2\pi) \end{aligned} \tag{3}$$

$$S_{Nx} = \tag{4}$$

$$1 - \left( \frac{2\gamma}{\pi} - \frac{4\gamma}{\pi} \sum_{n=2}^{\infty} \frac{1}{(n-1)(n+1)} \cos(n\theta) \right)$$

(n; even number)

$$i_{Nx} = \left(1 - \frac{2\gamma}{\pi}\right)\sqrt{2}\ i_m\sin(\theta - \phi) + \frac{2\gamma}{\pi}\ \sqrt{2}\ i_m{}^* \tag{5}$$

$$\sum_{n=2}^{\infty} \frac{1}{(n-1)(n+1)} [\sin\{(n+1)\theta - \phi\} -$$

$$\sin\{(n-1)\theta + \phi\}]$$

(n; even number)

Accordingly, current $i_{Nx}$ of one phase at the neutral point N pursuant to expression 5 is synthesized with those of the remaining phases to provide a resultant three-phase current $i_N$ at the neutral point N which, as indicated by expression 6, consists of higher harmonic components of even multiple of three and mostly contains a third harmonic component $i_{N3}$ (for m=1 in expression 6) as shown at (G) in FIG. 4.

$$i_N(\theta) = \sum_{x=U}^{W} i_{Nx}(\theta) = i_{NU}(\theta) + i_{NV}(\theta) + i_{NW}(\theta) \quad (6)$$

$$= i_{Nx}(\theta) + i_{Nx}\left(\theta - \frac{2\pi}{3}\right) + i_{Nx}\left(\theta - \frac{4\pi}{3}\right)$$

$$= \frac{6\gamma}{\pi} \sqrt{2}\, i_m \left[ \sum_{n=2+6m}^{W} \frac{1}{(n-1)(n+1)} \sin\{(n+1)\theta - \phi\} - \sum_{n=4+6m}^{\infty} \frac{1}{(n-1)(n+1)} \sin\{(n-1)\theta + \phi\} \right]$$

$(m = 0, 1, 2, 3, \ldots)$

Then, when the third harmonic component $i_{N3}$ of current $i_N$ at the neutral point N is expressed as illustrated at (G) in FIG. 4 pursuant to expression 7, its magnitude $I_{N3}$ and phase $\alpha$ relative to the modulating sine wave are derived from expression 6 (for m=0) so as to be expressed by expressions 8 and 9, respectively.

$$i_{N3} = \sqrt{2}\, I_{N3} \sin\{3(\theta - \alpha)\} \quad (7)$$

$$i_{N3} = \frac{6\gamma}{\pi} I_m \frac{2}{5} \sqrt{1 - \frac{5}{9}\cos^2\phi} \quad (8)$$

$$\alpha = \frac{1}{3} \tan^{-1}\left(\frac{3}{2} \tan\phi\right) \quad (9)$$

The third harmonic component $i_{N3}$ of current $i_N$ at the neutral point N branches to the voltage dividing capacitors 21 and 22 and as a result, voltage at the neutral point N fluctuates at a frequency which is three times the frequency of the modulating sine wave or inverter output frequency $F_{inv}$.

When each of the voltage dividing capacitors 21 and 22 has a capacitance of C, a fluctuation component $V_{N3}$ of voltage at the neutral point N and magnitude $V_{N3}$ thereof are expressed by expressions 10 and 11.

$$V_{N3} = \frac{1}{C}\int -\frac{i_{N3}}{2} \cdot dt = \sqrt{2}\, V_{N3}\sin\left\{3\left(\theta - \alpha + \frac{\pi}{6}\right)\right\} \quad (10)$$

$$V_{N3} = \quad (11)$$

$$\frac{1}{6\pi F_{inv} C} \cdot \frac{i_{N3}}{2} = \frac{1}{5\pi^2 C} \cdot \frac{\gamma}{F_{inv}} I_m \sqrt{1 - \frac{5}{9}\cos^2\phi}$$

As will be seen from the above expressions 8 and 11, the third harmonic component $I_{N3}$ of current at the neutral point N changes in proportion to percentage modulation $\gamma$, whereas the third harmonic component $V_{N3}$ of voltage at the neutral point N changes in proportion to $\gamma/F_{inv}$.

Figure 5:
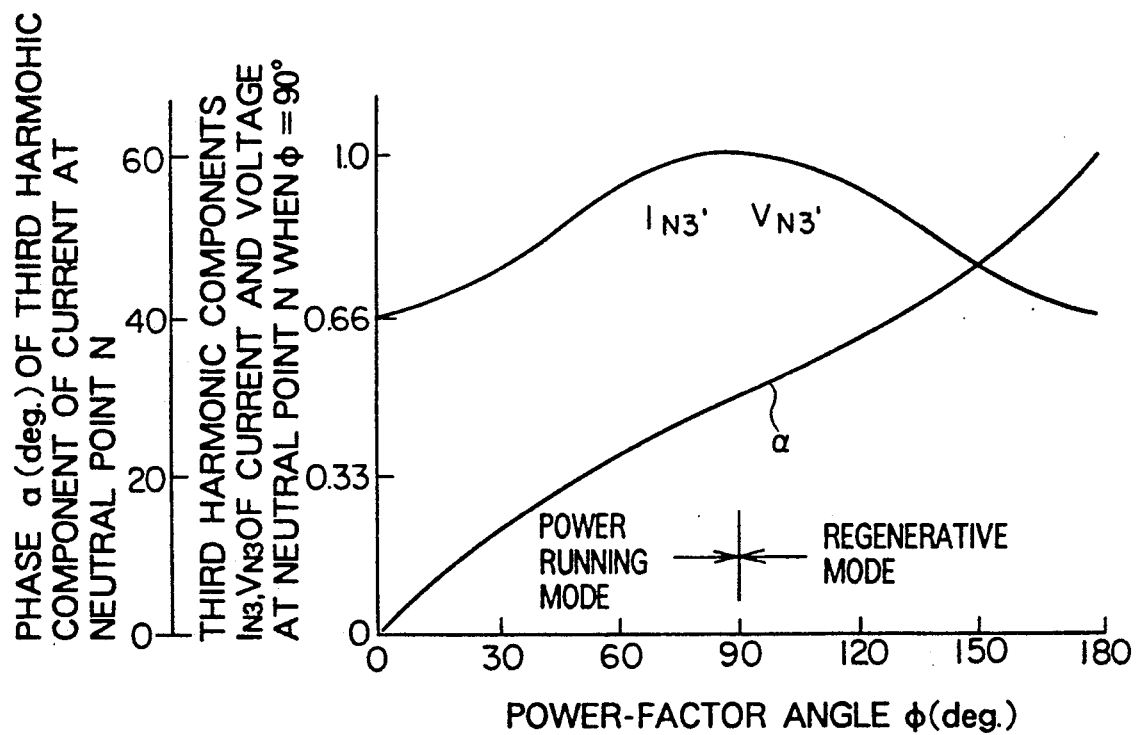
FIG. 5 is a characteristic diagram showing third harmonic components of neutral point current and neutral point voltage and phases.

Calculation of expressions 8 and 9 demonstrates that a third harmonic component $I_{N3'}$ of current at the neutral point N and a third harmonic component $V_{N3'}$ of voltage at the neutral point N, which are set to be 1 (one) for power-factor angle $\phi=90°$, change with respect to power-factor angle $\phi$ as shown in FIG. 5 wherein their changes in the power running mode ($0° \leq \phi < 90°$) and the regenerative mode ($90° < \phi \leq 180°$) are symmetrical with respect to the center at $\phi=90°$, with the maximum being at the center and a minimum of 0.67 being at $\phi=0°$ and 180°.

Also, calculation of expression 9 demonstrates that phase $\alpha$ changes substantially linearly ($\alpha \div \phi/3$) as shown in FIG. 5.

In a specified example where C, $I_m$, $\gamma/F_{inv}$ and $\phi$ in expression 11 and DC power supply voltage $E_d$ are C=4800 μF, $I_m$=800 A (for four induction motors 4), $\gamma/F_{inv}$=1/40 Hz, $\phi$=25° and $E_d$=1500 V, the third harmonic component $V_{N3}$ of voltage at the neutral point N is expressed by expression 12.

$$V_{N3} = \frac{1}{5\pi^2 \cdot 0.0048} \cdot \frac{1}{40} \cdot 800 \sqrt{1 - \frac{5}{9}\cos^2 25°} \approx 62.3 \text{ V} \quad (12)$$

amplitude ($2\sqrt{2}\, V_{N3}$)

The full amplitude ($\div 176.1$ V) of the third harmonic component of voltage at the neutral point N has a rate of 23.5% with respect to the DC average voltage (=voltage $E_d$ of DC power supply $\frac{1}{2}$=750 V).

The fluctuation in voltage at the neutral point N deforms the output current of inverter 3 (current of induction motor 4) and applies an over-voltage to the switching elements constituting the inverter 3, raising a cause of damaging the switching elements.

If the capacitance of the voltage dividing capacitors 21 and 22 are increased to reduce the fluctuation in voltage at the neutral point N, then the size of the inverter apparatus will be increased.

Accordingly, in the present embodiment, only the third harmonic component, of higher harmonic components generated at the neutral point, which is relatively larger in amplitude as compared to the other ripple component is suppressed. This will be detailed hereinafter.

In order to suppress the fluctuation in voltage at the neutral point N varying at a frequency which is three times the inverter output frequency $F_{inv}$ i.e., the third harmonic component of current at the neutral point N, third harmonic super position unit 64 of the modulating wave generator unit 6 of FIG. 1 is provided.

In third harmonic generator unit 641, a third harmonic sine wave at a frequency which is three times the fundamental wave (modulating sine wave) standing for the output of the fundamental wave generator unit 62 is generated as indicated by thin curve shown at (A) in FIG. 6 by, for example, frequency multiplication (amplitude and phase will be described later) and the third harmonic sine wave is superimposed on the fundamental wave by means of addition unit 642.

Figure 6:
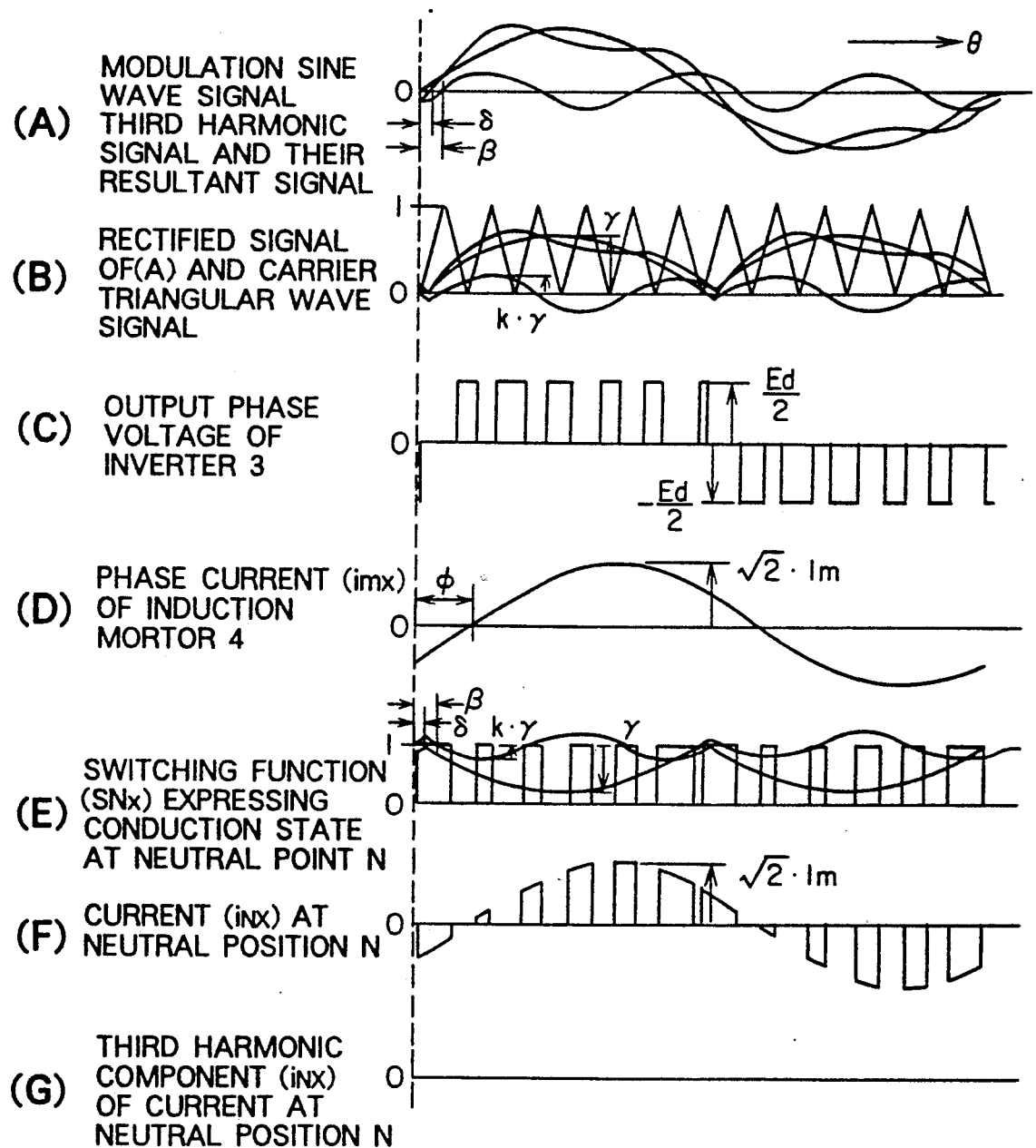
FIG. 6 is a diagram for explaining the operation of the invention.

Then, a signal (thick curve at (B) in FIG. 6) stemming from rectification of a resultant wave of the superposition of the third harmonic sine wave on the fundamental wave, indicated by thick curve at (A) in FIG. 6, is compared with the carrier triangular wave, as shown at (B) in FIG. 6, standing for the output of the carrier wave generator unit 53 by means of the comparator unit 52 to produce an output phase voltage of inverter 3 as shown at (C) in FIG. 6 which contains the third harmonic component.

Third harmonic components contained in output phase voltages of the inverter 3 cancel out and do not develop in voltage across the output terminals of inverter 3 (line voltage), without affecting the output current of inverter 3 i.e., the current of the induction motor 4.

The amplitude and phase of the third harmonic sine wave will now be described.

The peak value $\gamma$ of the modulating sine wave (percentage modulation) is multiplied by a constant value k (hereinafter referred to as superposition rate) by means of multiplication unit 643 of the third harmonic superposition unit 64 to provide k·$\gamma$ (representative of peak value of the third harmonic sine wave), the third harmonic sine wave in a unit of frequency which is three times the fundamental wave is multiplied by k·$\gamma$ as shown at (B) in FIG. 6, and the phase of the third harmonic sine wave relative to the modulating sine wave (hereinafter referred to as super-position phase) is given by $\beta$.

The switching function $S_{Nx}$ representing the conduction state of current flowing into and flowing out of the neutral point N in terms of 1 and 0 is expressed as indicated by thin curve at (E) in FIG. 6 pursuant to expression 13 and then expanded into a Fourier series as given by expression 14.

$$S_{Nx} = 1 - [\gamma\sin\theta + k \cdot \gamma\sin\{3(\theta - \beta)\}] \ldots (\delta \leq \theta \leq \pi + \delta) \qquad (13)$$
$$= 1 + [\gamma\sin\theta + k \cdot \gamma\sin\{3(\theta - \beta)\}] \ldots (\pi + \delta \leq \theta \leq 2\pi + \delta)$$

$$S_{Nx} = 1 - \left[ \frac{2\gamma}{\pi}\cos\delta + \frac{2\gamma}{\pi} \sum_{n=2}^{\infty} \left\{ \frac{1}{n+1}\cos(n\theta - (n+1)\delta) - \frac{1}{n-1}\cos(n\theta - (n-1)\delta) \right\} + \frac{2k\cdot\gamma}{3\pi}\cos(3(\delta - \beta)) + \frac{2k\cdot\gamma}{\pi} \sum_{n=2}^{\infty} \left\{ \frac{1}{n+3}\cos(n\theta - (n+3)\delta + 3\delta) - \frac{1}{n-3}\cos(n\theta - (n-3)\delta - 3\beta) \right\} \right] \qquad (14)$$

(n; even number)

Here, $\delta$ is a phase at which the resultant wave shown at (A) in FIG. 6 becomes zero, that is, by which expression 15 is allowed to stand.

$$\gamma \sin \delta + k \cdot \gamma \sin\{3(\delta - \beta)\} = 0 \qquad (15)$$

Accordingly, current $i_{Nx}$ of one phase at the neutral point N as shown at (F) in FIG. 6 can be calculated by substituting expressions 14 and 1 indicative of the phase current of induction motor 4 into expression 2, so as to be given by expression 16.

$$i_{Nx} = \left( 1 - \frac{2\gamma}{\pi}\cos\delta - \frac{2k\cdot\gamma}{3\pi}\cos(3(\delta - \beta)) \right)\sqrt{2}\,i_m\sin(\theta - \phi) -$$

$$\frac{\gamma}{\pi}\sqrt{2}\,i_m \sum_{n=2}^{\infty} \left[ \frac{1}{n+1}\{\sin((n+1)\theta - \phi - (n+1)\delta) - \sin((n-1)\theta + \phi - (n+1)\delta)\} - \frac{1}{n-1}\{\sin((n+1)\theta - \phi - (n-1)\delta) - \sin((n-1)\theta + \phi - (n-1)\delta)\} \right] -$$

$$\frac{\gamma}{\pi}\sqrt{2}\,i_m \sum_{n=2}^{\infty} \left[ \frac{k}{n+3}\{\sin((n+1)\theta - \phi - (n+3)\delta + 3\beta) - \sin((n-1)\theta + \phi - (n+3)\delta + 3\beta)\} - \frac{k}{n-3}\{\sin((n+1)\theta - \phi - (n-3)\delta - 3\beta) - \sin((n-1)\theta + \phi - (n-3)\delta - 3\beta)\} \right]$$

(n; even number)

The current $i_{Nx}$ of one phase at the neutral point N is synthesized with those of the remaining phases to provide a resultant $i_N$ at neutral point N which, as indicated by expression 17, consists of higher harmonic components of odd multiple of three.

$$i_N(\theta) = i_{Nx}(\theta) + i_{Nx}\left(\theta - \frac{2\pi}{3}\right) + i_{Nx}\left(\theta - \frac{4\pi}{3}\right) \qquad (17)$$

$$= \frac{-3\gamma\sqrt{2}\,i_m}{\pi} \left[ \sum_{n=2+6m}^{\infty} \left\{ \frac{1}{n+1}\sin((n+1)\theta - \phi - (n+1)\delta) - \frac{1}{n-1}\sin((n+1)\theta - \phi - (n-1)\delta) + \frac{k}{n+3}\sin((n+1)\theta - \phi - (n+3)\delta + 3\beta) - \frac{k}{n-3}\sin((n+1)\theta - \phi - (n-3)\delta - 3\beta) \right\} - \sum_{n=4+6m}^{\infty} \left\{ \frac{1}{n+1}\sin((n-1)\theta + \phi - (n+1)\delta) - \frac{1}{n-1}\sin((n-1)\theta + \phi - (n-1)\delta) + \frac{k}{n+3}\sin((n-1)\theta + \phi - (n+3)\delta + 3\beta) - \frac{k}{n-3}\sin((n-1)\theta + \phi - (n-3)\delta - 3\beta) \right\} \right]$$

(m = 0, 1, 2, 3 ...)

Figure 7:
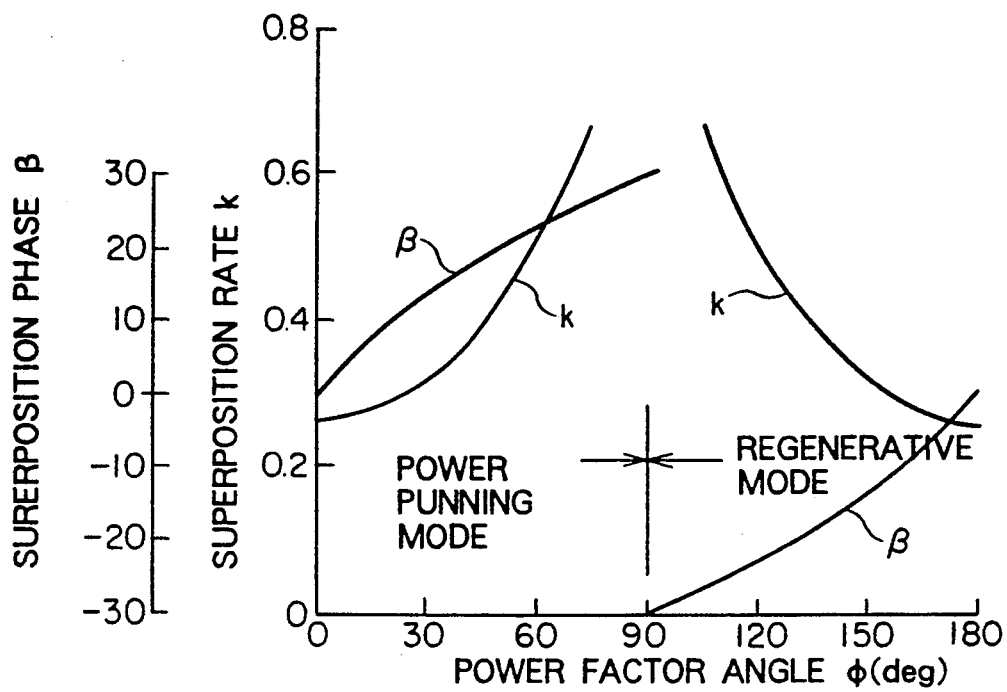
FIG. 7 is a diagram showing, with respect to the power-factor angle, the superposition rate and superposition phase which make zero the third harmonic component of neutral point current.

Superposition rate k and superposition phase $\beta$ are determined from expressions 17 and 15 for power-factor angle $\phi$ at which the third harmonic component of current $i_N$ at the neutral point N (indicated by expression 17 for M=0) becomes 0 (at (G) in FIG. 6) to obtain results as shown in FIG. 7, indicating that k and β change greatly with ϕ.

Next, how the power-factor angle ϕ and the superposition rate k and superposition phase β which make zero the third harmonic component of current at the neutral point N (voltage at the neutral point N) change with the inverter output frequency $F_{inv}$ will be described by referring to an example of calculation.

Figure 8:
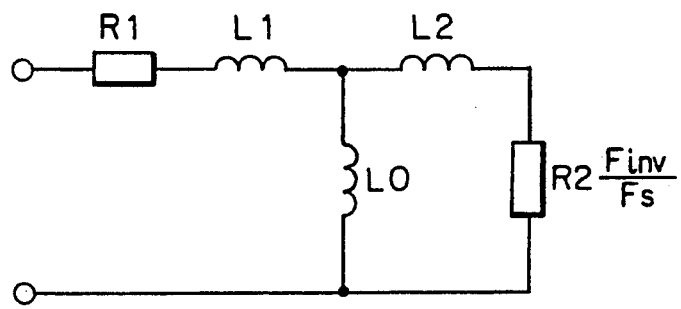
FIG. 8 is a T-type equivalent circuit of an induction motor.

The objective induction motor 4 has 170 kW rated power and its T-type equivalent circuit and constants are shown in FIG. 8.

In FIG. 8, the slip frequency $F_s$ is set to be constant (3 Hz for the power running mode and −3 Hz for the regenerative mode) and under this condition, the power-factor angle ϕ is determined with respect to inverter output frequency $F_{inv}$ and for the ϕ, the superposition rate k and superposition phase β which make zero the third harmonic component of current at the neutral point N (voltage at the neutral point N) are determined from FIG. 7. Results are shown in FIG. 9.

Figure 9A:
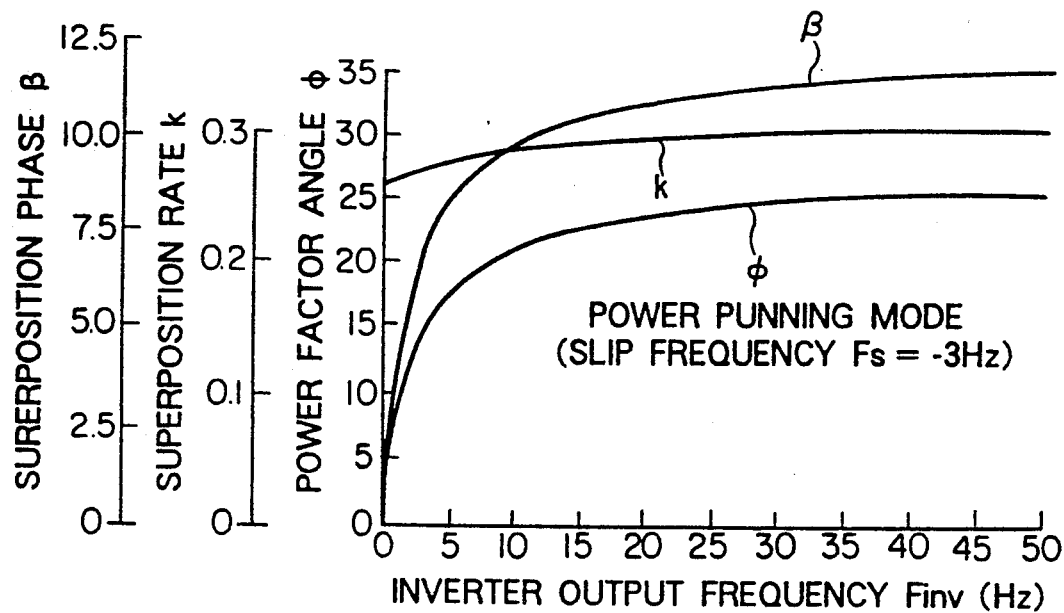
FIGS. 9A and 9B show characteristic curves with respect to the inverter output frequency, the power-factor angle and the superposition rate and superposition phase which make zero the third harmonic component of neutral point current.
Figure 9B:
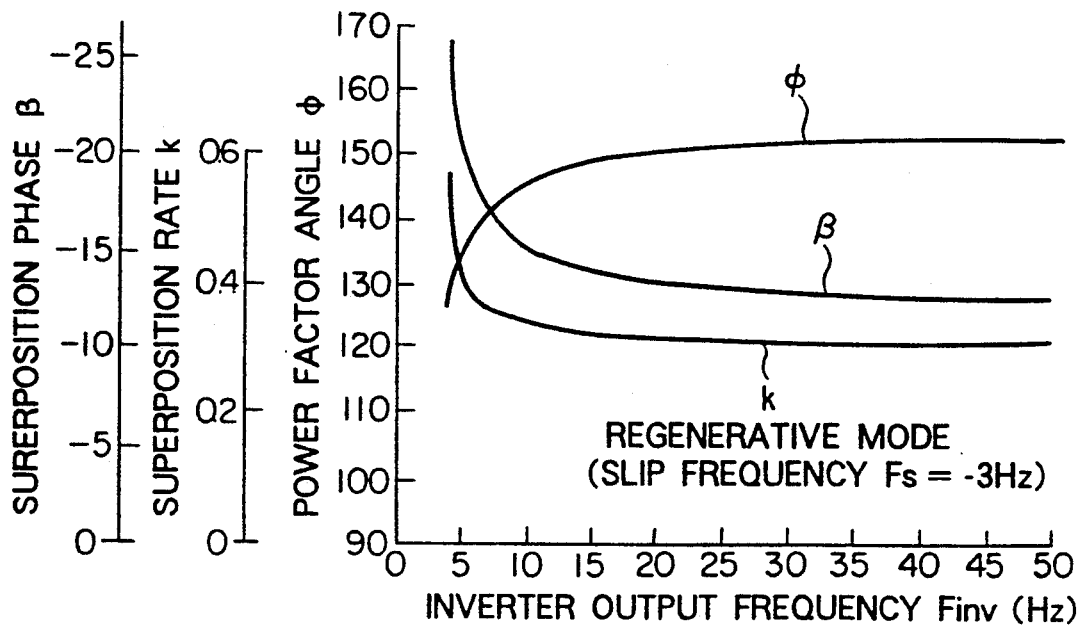

As shown in FIG. 9, in both the power-running and regenerative modes, all of the power-factor angle ϕ, superposition rate k and superposition phase β change greatly for inverter output frequency (frequency of the fundamental wave) $F_{inv} < 5$ to 10 Hz but are substantially constant for $F_{inv} > 10$ to 15 Hz.

Accordingly, for at least inverter output frequency $F_{inv} > 10$ to 15 Hz, the k·γ resulting from multiplication of percentage modulation γ standing for the output of the voltage control unit 7 by constant superposition rate k by means of the multiplication unit 643 and constant superposition phase β are supplied to the third harmonic generator unit 641 of third harmonic superposition means 64 shown in FIG. 1. Through this, the fluctuation in voltage at the neutral point can be suppressed effectively with simplified construction.

Figure 10A:
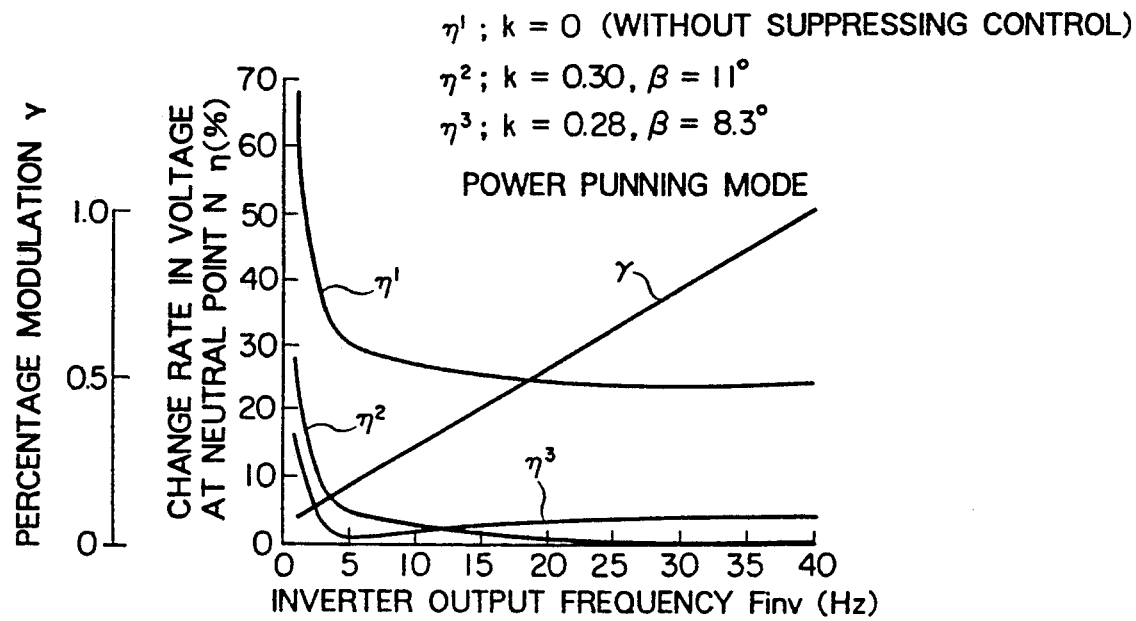
FIGS. 10A and 10B show characteristic curves with respect to the inverter output frequency, the rate of change in neutral point voltage.
Figure 10B:
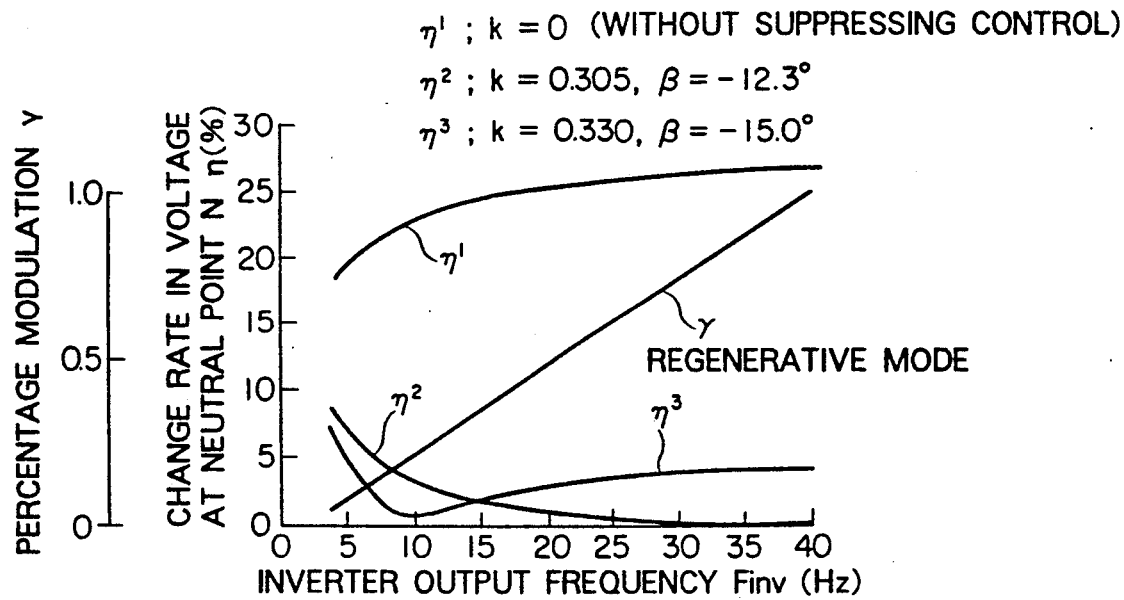

Now, an example of the rate of change of voltage at the neutral point N due to the third harmonic component, calculated with respect to the inverter output frequency $F_{inv}$ when the superposition rate k and superposition phase β are set to be constant, will be illustrated in FIG. 10.

In the calculation, percentage modulation γ/inverter output frequency $F_{inv}$ (shown in FIG. 10) is set such that current $I_m$ of induction motors 4 (representative of effective values of four motors) measures a constant value of 800 A in the power running mode (slip frequency $F_s = 3$ Hz) and a constant value of 880 A in the regenerative mode ($F_s = -3$ Hz), the power-factor angle ϕ is determined in accordance with FIG. 8, the third harmonic component $V_{N3}$ (effective value) of voltage at the neutral point N is determined from expressions 17, 15 and 11 by using the ϕ, constant superposition rate k and superposition phase β, and the rate of the full amplitude of the $V_{N3}$ of voltage at the neutral point N with respect to the DC average voltage (=voltage $E_d$ of DC power supply ½) is calculated pursuant to expression 18 to provide a rate of change η of voltage at the neutral point N.

The voltage $E_d$ of DC power supply 1 was 1500 V and capacitances C of the voltage dividing capacitors 21 and 22 in expression 11 were each 4800 μF.

$$\eta = \frac{2\sqrt{2} \, V_{N3}}{E_d/2} \times 100 \, (\%) \qquad (18)$$

From FIG. 10, the following can be studied.

More particularly, when in FIG. 8 the superposition rate k is 0.3 and superposition phase β is 11° in the power running mode and k is 0.305 and β is −12.3° in the regenerative mode, the rate of change of voltage at the neutral point N (η2 in FIG. 10) can be suppressed for inverter output frequency $F_{inv} > 10$ to 15 Hz in both the power running and regenerative modes, amounting to about 25% to several % or less of that obtained when no suppression control is carried out (η1 in FIG. 10).

For $F_{inv} < 10$ to 15 Hz, the suppression effect is sufficient but the rate of change η2 of voltage a the neutral point N is very large.

Then, when the superposition rate k=0.28 and superposition phase β=0.83° in the power running mode and k=0.33 and β=−15° in the regenerative mode are set pursuant to FIG. 9, the rate of change of voltage at the neutral point N (η3 in FIG. 10) can be smaller than η2 in FIG. 10 for inverter output frequency $F_{inv} < 10$ to 15 Hz in both the power running and regenerative modes.

Thus, in the present embodiment, by making the superposition rate k and superposition phase β constant regardless of the inverter output frequency, the fluctuation in voltage at the neutral point can be suppressed effectively with simplified construction (without imposing large load on software, microprocessor and the like).

Incidentally, in the present embodiment, voltage at the neutral point fluctuates relatively greatly for inverter output frequency $F_{inv} < 10$ to 15 Hz. However, if outputs of superposition rate generator unit 644 and superposition phase generator u it 645 of the third harmonic superposition unit 64 shown in FIG. 1 and inverter output frequency $F_{inv}$ are inputted to change the superposition rate k and superposition phase β suitably in compliance with F inv, then the rate of change of voltage at the neutral point N can be suppressed to the degree approximating the case of $F_{inv} > 10$ to 15 Hz. This will be detailed below.

For the inverter output frequency $F_{inv}$ being 10 to 15 or more Hz, the fluctuation in voltage at the neutral point can be suppressed effectively with simplified construction by applying the aforementioned predetermined values to the superposition rate k and superposition phase β.

In the region of the inverter output frequency $F_{inv}$ being 10 to 15 or less Hz (hereinafter referred to as low frequency region), however, a voltage fluctuation at a high rate still remains even though the rate of change of voltage at the neutral point is reduced.

Then, according to the present embodiment, in the low frequency region, predetermined values (for example, k=0.28 and β=8.3°) different from those for the region of the inverter output frequency $F_{inv}$ being 10 to 15 or more Hz are used for the superposition rate k and superposition phase β.

With this construction, the fluctuation in voltage at the neutral point can be suppressed effectively over the entire running region without imposing load on the software.

A second embodiment will now be described with reference to FIG. 1.

Since in the foregoing embodiment the superposition rate k and superposition phase $\beta$ are set to constant values, the fluctuation in voltage at the neutral point cannot be suppressed finely in compliance with the inverter frequency. In an embodiment to be described hereinafter, superposition rate k or (and) superposition phase $\beta$ in compliance with the inverter frequency are patterned as shown in FIG. 9 and provided in the superposition generator unit 644 or (and) superposition phase generator unit 645 shown in FIG. 1, whereby by receiving the inverter output frequency $F_{inv}$ as shown at dotted line and the output of a power running regeneration decision circuit (not shown), the unit 644 or (and) 645 can suppress the fluctuation in voltage at the neutral point effectively with simplified construction as compared to the case of real-time operation without imposing load on the software and microprocessor.

The following construction may be considered as this embodiment.

(1) Over the entire running region, a third harmonic is superposed which conforms with patterns of superposition rate k and superposition phase $\beta$ as shown in FIG. 9.

(2) Over the entire running region, a third harmonic is superposed which conforms with a pattern of superposition rate k as shown in FIG. 9 and the superposition phase $\beta$ is set to a constant value.

(3) Over the entire running region, a third harmonic is superposed which conforms with a pattern of superposition phase $\beta$ as shown in FIG. 9 and the superposition rate k is set to a constant value.

(4) In the region of the inverter output frequency being 10 to 15 or more Hz, constant values are given to both the superposition rate k and superposition phase $\beta$ and in the region of lower frequencies, a third harmonic is superposed which conforms with patterns of superposition k and superposition phase $\beta$ as shown in FIG. 9.

(5) In the region of the inverter output frequency being 10 to 15 or more Hz, constant values are given to both the superposition rate k and superposition phase $\beta$ and in the region of lower frequencies, a third harmonic is superposed which conforms with a pattern of superposition rate k as shown in FIG. 9 and the superposition phase $\beta$ is set to a constant value.

(6) In the region of the inverter output frequency being 10 to 15 or more Hz, constant values are given to both the superposition rate k and superposition phase $\beta$ and in the region of lower frequencies, a third harmonic is superposed which conforms with a pattern of superposition position phase $\beta$ as shown in FIG. 9 and the superposition rate k is set to a constant value. The mode of (1) as above attains the effect that suppression of fluctuation in neutral point voltage which is optimized for all frequencies can be accomplished.

The mode (2) or (3) as above attains the effect that while one of the k and $\beta$ is rendered constant to slightly reduce the suppression effect, the construction can be simplified (however, the pattern will sometimes deviate from that shown in FIG. 9).

The mode (4) as above attains the effect that the pattern in FIG. 9 is followed only in the low frequency region subject to large fluctuation width in accordance with the inverter output frequency to accomplish sufficient suppression effect and besides the construction can be simplified.

The mode (5) or (6) as above attains the effect that while the suppression effect is inferior to that obtained with the mode (4), the construction can be simplified.

Incidentally, the foregoing embodiments question the problem that the fluctuation in voltage at the neutral point in accordance with the inverter frequency is large in the low frequency region and they are so constructed as to change the superposition rate k and superposition phase $\beta$ in compliance with the inverter frequency. But, in embodiments to be described hereinafter, the fluctuation in neutral point voltage can be suppressed more effectively than in the previously-described first embodiment by merely setting the k and $\beta$ to constant values over the entire running region or in the region of frequencies which exceed a predetermined frequency. A third embodiment will now be detailed.

In recent years, a modulation scheme called a dipolar modulation scheme has newly been proposed in the three-level inverter.

For example, in "A Novel Approach to the Generation and Optimization of Three-level PWM Wave Forms", PESC' 88 Record. April, 1988, pp. 1255–1262, a dipolar modulation scheme is proposed which delivers positive and negative pulse-like voltages alternately through zero voltage in order to improve waveforms of a three-level inverter, and this literature also describes that the dipolar modulation scheme may shift to the unipolar modulation scheme (FIG. 3) which delivers only a pulse-like voltage having the same polarity as the output voltage.

The dipolar modulation scheme will be described with reference to FIG. 11.

Figure 11:
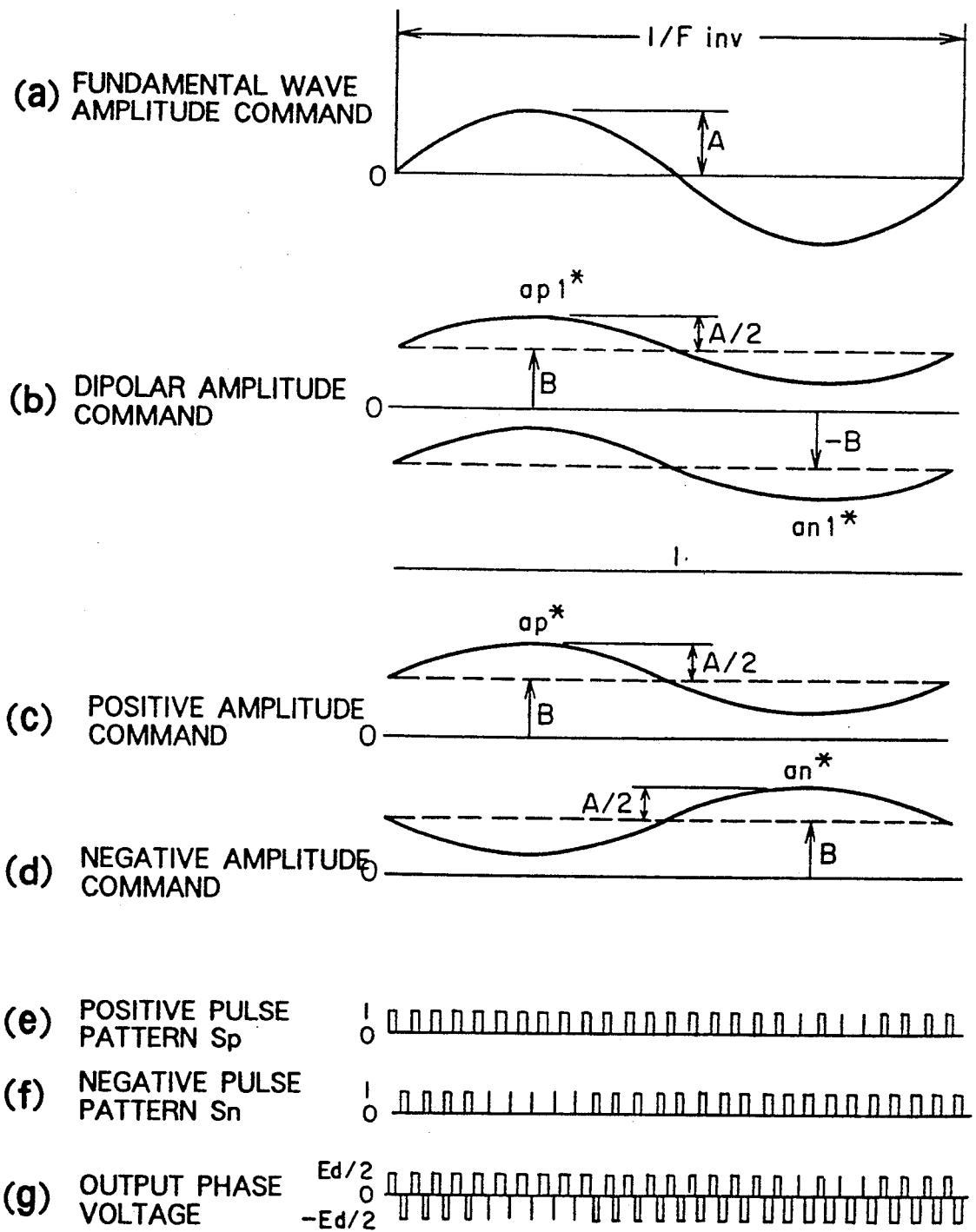
FIG. 11 is a diagram for explaining the dipolar modulation scheme.

FIG. 11 illustrates at (a) a command of a fundamental wave and when its amplitude is large, it can be expressed as the inverter output voltage with fidelity even with the unipolar modulation scheme as shown in FIG. 3. However, when voltage is low (when, for example, an induction motor is controlled in the low frequency region, control is carried out with V/F rendered constant and in the region of low frequencies the output voltage of the inverter is also low), constraint imposed on the minimum on/off time of switching elements prevents delivery of voltage copying the fundamental wave command with fidelity in the course of expressing a small voltage as the inverter output voltage.

Then, by producing a pulse train of inverter output phase voltage as shown at (g) in FIG. 11 (a small voltage is represented by subtraction between widths of positive and negative pulses), an output voltage waveform copying the fundamental wave with fidelity can be obtained as an average value of voltages of the pulse train.

The manner of producing such a pulse train will be described with reference to FIGS. 1 and 11.

The fundamental wave generator unit 62 of FIG. 1 halves amplitude A of the fundamental wave amplitude command shown at (a) in FIG. 11 to provide two amplitude commands apl* and anl* which are respectively offset by B corresponding to the amplitude A about the center of zero (at (b)). The negative amplitude command is inverted, thus providing a positive amplitude command ap* and a negative amplitude command an* which in turn are compared with the carrier wave to produce a positive pulse pattern Sp and a negative pulse pattern $S_n$.

The positive pulse pattern $S_p$ is applied to the upper switching elements G1 and G2 of FIG. 1 and the negative pulse pattern Sn is applied to the lower switching elements G3 and G4 to provide the output phase voltage (at (g)).

The dipolar modulation scheme is not preferable for the region of high inverter output voltage (the region in which high frequency prevails) because the loss increases. Therefore, it is used in the low frequency region.

In this scheme, the fundamental wave is produced using positive and negative two modulating waves as shown at (c) and (d) in FIG. 11. Through the use of these modulating waves, the upper and lower arms are allowed to switch alternately, thereby ensuring that current at the neutral point cancel out mutually and the fluctuation in voltage at the neutral point can almost be eliminated.

In the present embodiment, this modulating scheme is used in the low frequency region and in the region of higher frequency, constant values are given to both the superposition rate k and superposition phase $\beta$.

This construction can attain the effect that the fluctuation in neutral point voltage can be prevented efficiently over the entire region.

When the frequency region using this modulating scheme is determined to fall under startup (approximately 0 to 5 Hz), the fluctuation in neutral point voltage increases in a region of 5~10 through 15 Hz.

Therefore, it is conceivable in this region to set the superposition rate k and superposition phase $\beta$ to constant values which are the most effective for this region or to change them in accordance with frequency.

Since this modulating scheme uses the positive and negative two modulating waves, any superimposed third harmonic can be cancelled out, having no influence upon the output.

Thus, even in the region employing this modulating scheme, both the superposition rate k and superposition phase $\beta$ are designed to be applied with constant values.

This can afford to attain the effect that the fluctuation in voltage at the neutral point can be suppressed effectively with the simplified construction.

Figure 12:
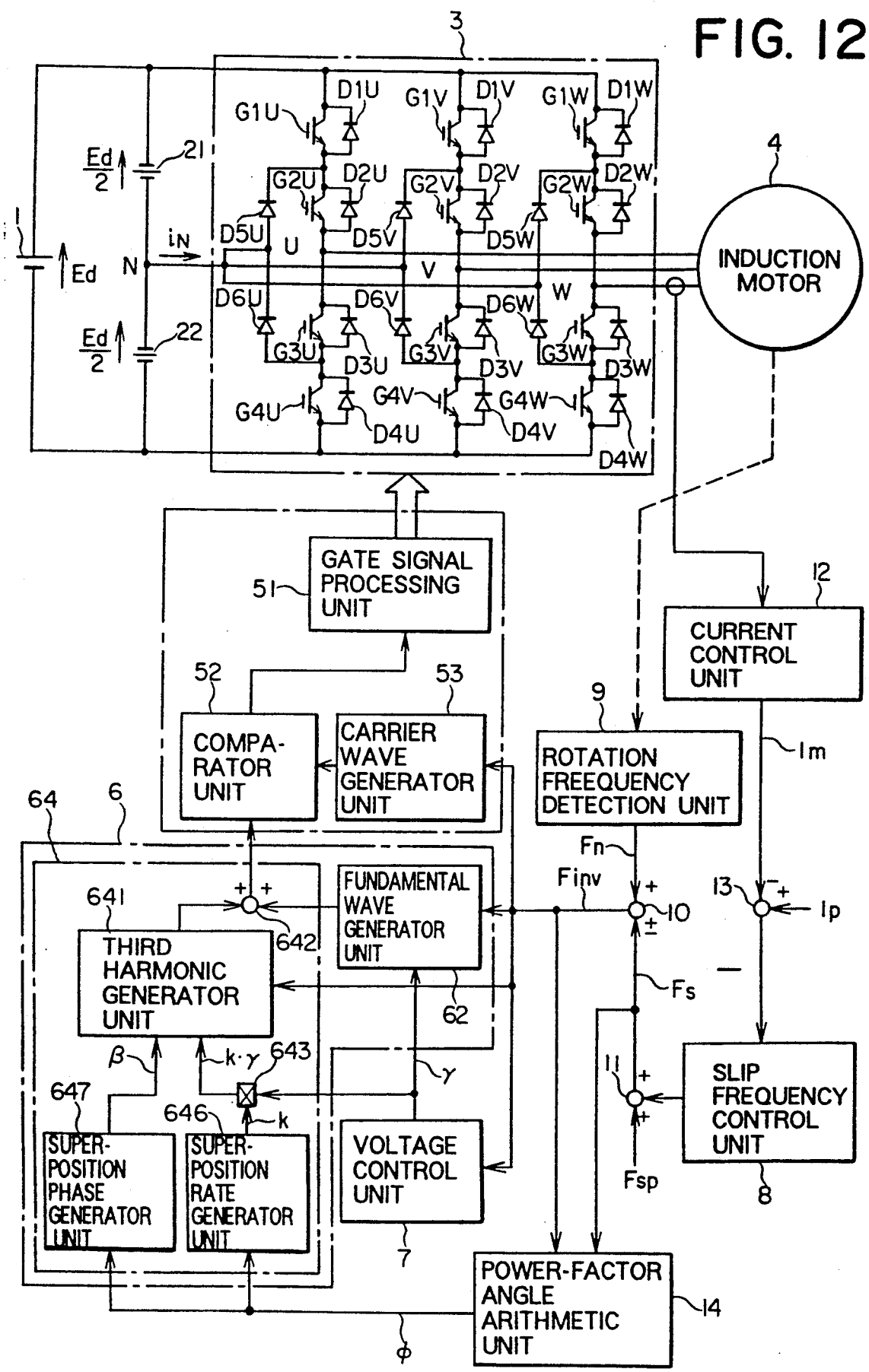
FIG. 12 is a diagram for explaining another embodiment of the invention.

FIG. 12 shows a fourth embodiment.

The fourth embodiment differs from the foregoing first and second embodiments in that power-factor arithmetic unit 14 calculates power-factor angle $\phi$ on the basis of inverter output frequency $F_{inv}$ and slip frequency $F_s$ and superposition rate generator unit 646 and superposition phase generator unit 647 of third harmonic superposition unit 64 shown in FIG. 12 respond to the power-factor angle $\phi$ to control superposition rate k and superposition phase $\beta$ on the basis of FIG. 7.

As a result, in the present embodiment, the superposition rate k and superposition phase $\beta$ can be controlled suitably with respect a change in power-factor angle $\phi$ due to a running condition, for example, slip frequency F s (change of characteristics of FIG. 9) as compared to the first and second embodiments and therefore the effect of suppressing the fluctuation in voltage at the neutral point N due to the third harmonic component can be improved with the simplified construction.

According to the invention, the third harmonic having the maximum amplitude in the higher harmonics contained in neutral point voltage is used as an object to be suppressed and the superposition rate and superposition phase of a third harmonic for suppression to be superposed on the fundamental wave command are set to constant values, the fluctuation in voltage at the neutral point can advantageously be suppressed effectively with simplified software without imposing load on the microprocessor.

What is claimed is:

1. A control apparatus of power converter comprising:
   a plurality of capacitors connected in series to divide DC voltage;
   a power converter fed with direct current from said capacitors and operative to convert the direct current into AC phase voltages each having three or more levels of potential; and
   modulating wave generator means for generating a command of a fundamental wave of alternating current delivered out of said power converter;
   wherein said modulating wave generator means has means for applying to said fundamental wave a third harmonic component thereof, and said third harmonic component is derived using values which do not change with the frequency of said fundamental wave.

2. A control apparatus of power converter comprising:
   a plurality of capacitors connected in series to divide DC voltage;
   a power converter fed with direct current from said capacitors and operative to convert the direct current into AC phase voltages each having three or more levels of potential; and
   modulating wave generator means for generating a command of a fundamental wave of alternating current delivered out of said power converter;
   wherein said modulating wave generator means has means for applying to said fundamental wave a third harmonic component thereof in a predetermined frequency region of said fundamental wave, and said third harmonic component has a ratio of amplitude to that of said fundamental wave and a phase which are constant.

3. A control apparatus of power converter comprising:
   a plurality of capacitors connected in series to divide DC voltage;
   a power converter fed with direct current from said capacitors and operative to convert the direct current into AC phase voltages each having three or more levels of potential; and
   modulating wave generator means for generating a command of a fundamental wave of alternating current delivered out of said power converter;
   wherein said modulating wave generator means has means for applying to said fundamental wave a third harmonic component thereof, and said third harmonic component has a constant ratio of amplitude to that of said fundamental wave and a phase relative to said fundamental wave which changes with the frequency thereof.

4. A control apparatus of power converter comprising:
   a plurality of capacitors connected in series to divide DC voltage;
   a power converter fed with direct current from said capacitors and operative to convert the direct current into AC phase voltages each having three or more levels of potential; and
   modulating wave generator means for generating a command of a fundamental wave of alternating current delivered out of said power converter;
   wherein said modulating wave generator means has means for applying to said fundamental wave a third harmonic component thereof, and said third harmonic component has a ratio of amplitude to that of said fundamental wave which changes with the frequency thereof and a constant phase relative to said fundamental wave.

5. A control apparatus of power converter comprising:
- a plurality of capacitors connected in series to divide DC voltage;
- power converter fed with direct current from said capacitors and operative to convert the direct current into AC phase voltages each having three or more levels of potential; and
- modulating wave generator means for generating a command of a fundamental wave of alternating current delivered out of said power converter;
- wherein said modulating wave generator means is means for applying, in a first frequency region of said fundamental wave, a third harmonic component thereof having a ratio of amplitude to that of said fundamental wave and a phase which change with the frequency of said fundamental wave and applying, in a second frequency region of said fundamental wave, a third harmonic component thereof having a ratio of amplitude to that of said fundamental wave and a phase which are constant.

6. A control apparatus of power converter comprising:
- a plurality of capacitors connected in series to divide DC voltage;
- a power converter fed with direct current from said capacitors and operative to convert the direct current into AC phase voltages each having three or more levels of potential;
- modulating wave generator means for generating a command of a fundamental wave of alternating current delivered out of said power converter; and
- modulating means having a modulating region which expresses a half period of an output phase voltage of said fundamental wave by delivering positive and negative pulses to said power converter alternately;
- wherein said modulating wave generator means is means for applying, in a region other than said modulating region, a third harmonic component of said fundamental wave having a ratio of amplitude to that of said fundamental wave and a phase which are constant.

7. A control apparatus of power converter comprising:
- a plurality of capacitors connected in series to divide DC voltage;
- a power converter fed with direct current from said capacitors and operative to convert the direct current into AC phase voltages each having three or more levels of potential;
- modulating wave generator means for generating a command of a fundamental wave of alternating current delivered out of said power converter; and
- modulating means having a modulating region which expresses a half period of an output phase voltage of said fundamental wave by delivering positive and negative pulses to said power converter alternately;
- wherein said modulating wave generator means is means for applying, in a region inclusive of said modulating region, a third harmonic component having a ratio of amplitude to that of said fundamental wave and a phase which are constant.

8. A control apparatus of power converter comprising:
- a plurality of capacitors connected in series to divide DC voltage;
- a power converter fed with direct current from said capacitors and operative to convert the direct current into AC phase voltages each having three or more levels of potential; and
- modulating wave generator means for generating a command of a fundamental wave of alternating current delivered out of said power converter;
- wherein said modulating wave generator means is means for preparing, from said fundamental wave, a unit sine wave having a frequency which is three times the frequency of said fundamental wave and applying, to said fundamental wave, a third harmonic component having a ratio of amplitude to that of said fundamental wave and a phase which change with the frequency of said fundamental wave.

9. A control apparatus of power converter comprising:
- a plurality of capacitors connected in series to divide DC voltage;
- a power converter fed with direct current from said capacitors and operative to convert the direct current into AC phase voltages each having three or more levels of potential; and
- modulating wave generator means for generating a command of a fundamental wave of alternating current delivered out of said power converter;
- wherein said modulating wave generator means is means for preparing, from said fundamental wave, a unit sine wave having a frequency which is three times the frequency of said fundamental wave and applying, to said fundamental wave, a third harmonic component having a ratio of amplitude to that of said fundamental wave and a phase which change with the power-factor angle.

* * * * *